United States Patent
Kreuder

(10) Patent No.: US 9,864,771 B2
(45) Date of Patent: Jan. 9, 2018

(54) METHOD AND SERVER FOR SYNCHRONIZING A PLURALITY OF CLIENTS ACCESSING A DATABASE

(75) Inventor: Heinz Kreuder, Messel (DE)

(73) Assignee: Software AG, Darmstadt (DE)

( * ) Notice: Subject to any disclaimer, the term of this patent is extended or adjusted under 35 U.S.C. 154(b) by 1669 days.

(21) Appl. No.: 11/748,971

(22) Filed: May 15, 2007

(65) Prior Publication Data

US 2008/0282247 A1 Nov. 13, 2008

(30) Foreign Application Priority Data

May 7, 2007 (EP) ..................................... 07009132

(51) Int. Cl.
| | |
|---|---|
| G06F 7/00 | (2006.01) |
| G06F 17/00 | (2006.01) |
| G06F 17/30 | (2006.01) |
| G06F 9/48 | (2006.01) |
| G06F 13/14 | (2006.01) |

(52) U.S. Cl.
CPC ........ *G06F 17/30359* (2013.01); *G06F 9/485* (2013.01); *G06F 17/30306* (2013.01)

(58) Field of Classification Search
CPC ........... G06F 17/30578; G06F 17/3089; G06F 17/30174; G06F 17/3048; G06F 17/30545; G06F 17/30581; G06F 17/30902; G06F 17/30575; G06F 17/30209
USPC ................ 709/224–230, 217, 203, 223, 248; 707/741, 654, E17.01, 610, 638, 640, 707/999.204; 710/22, 58; 718/100–105; 715/732; 702/182; 370/328, 350–352; 716/126, 134
See application file for complete search history.

(56) References Cited

U.S. PATENT DOCUMENTS

| | | | |
|---|---|---|---|
| 5,701,457 A | | 12/1997 | Fujiwara |
| 5,903,730 A | * | 5/1999 | Asai et al. .................... 709/224 |
| 6,182,109 B1 | * | 1/2001 | Sharma ................. G06F 9/5027 709/203 |
| 6,477,558 B1 | * | 11/2002 | Irving ................... G06F 9/4887 718/100 |
| 6,658,589 B1 | | 12/2003 | Taylor |

(Continued)

FOREIGN PATENT DOCUMENTS

| | | |
|---|---|---|
| CN | 1858759 A | 11/2006 |
| EP | 0735462 | 10/1996 |
| WO | 0120446 | 3/2001 |

OTHER PUBLICATIONS

Chinese Office Action for Application No. CN 1858759A; dated Jan. 29, 2010, 19 pages.

(Continued)

*Primary Examiner* — Heather Herndon
*Assistant Examiner* — Cecile Vo
(74) *Attorney, Agent, or Firm* — Meyertons Hood Kivlin Kowert & Goetzel, P.C.; Jeffrey C. Hood

(57) ABSTRACT

The invention relates to a method of synchronizing a plurality of clients accessing a database, each client executing a plurality of tasks on the database, wherein the method comprises for each of the clients the steps of accumulating the time of one or more tasks performed by the client after the issuance of a synchronization request and rejecting a request for the opening of a new task of the client, if the accumulated task time exceeds a maximum accumulated task time.

20 Claims, 4 Drawing Sheets

(56) References Cited

U.S. PATENT DOCUMENTS

Figure 1:
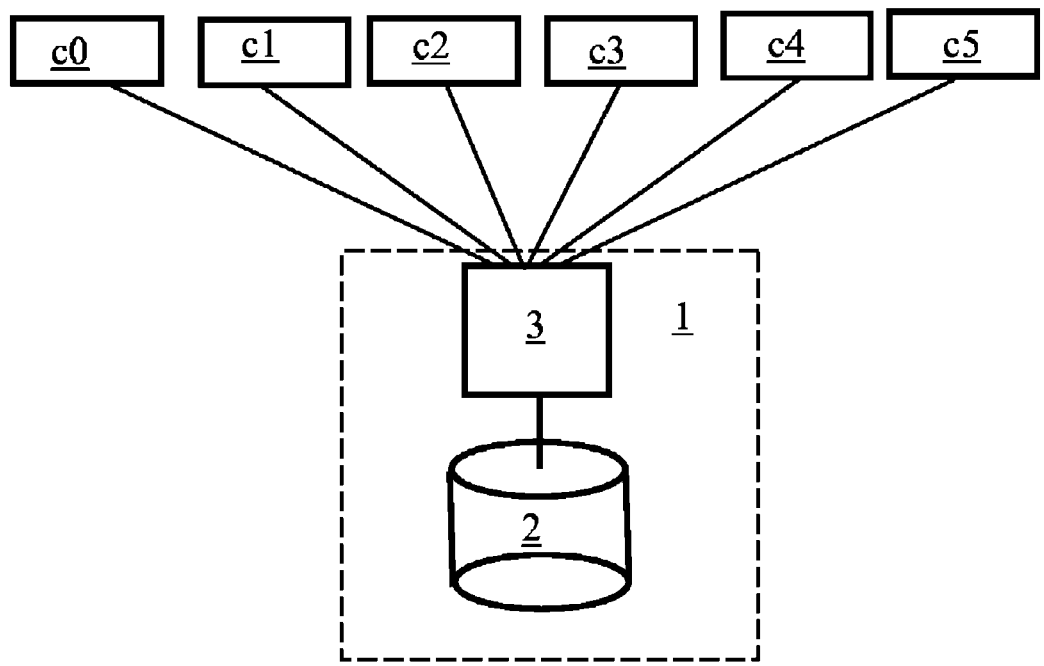

| | | | |
|---|---|---|---|
| 6,772,244 B2 * | 8/2004 | Nguyen | G06F 9/466 710/58 |
| 6,820,085 B2 | 11/2004 | Nishizawa et al. | |
| 6,922,729 B1 * | 7/2005 | Cheung | G06F 17/30286 707/E17.005 |
| 6,999,978 B2 | 2/2006 | Frank et al. | |
| 7,194,556 B2 * | 3/2007 | Rajagopal | G06F 1/12 375/354 |
| 7,711,790 B1 * | 5/2010 | Barrett | H04L 63/1408 709/217 |
| 8,903,730 B2 * | 12/2014 | Zong | G10L 21/04 704/503 |
| 2004/0061290 A1 * | 4/2004 | Gray, Jr. | F01N 3/035 277/411 |
| 2004/0064290 A1 * | 4/2004 | Cabral et al. | 702/182 |
| 2005/0080898 A1 * | 4/2005 | Block | G06F 17/30699 709/225 |
| 2005/0210079 A1 * | 9/2005 | Edlund | G06F 17/30174 |
| 2008/0071947 A1 * | 3/2008 | Fischer | G06F 13/24 710/48 |
| 2009/0011830 A1 | 1/2009 | Wang et al. | |

OTHER PUBLICATIONS

European search report for application No. EP 07009132.7, dated Nov. 12, 2007.

Zilker, et al.; "High-speed data acquisition with the Solaris and Linus operating systems"; Fusion Engineering and Design; Elsevier Science Publishers; vol. 48, No. 1-2; Aug. 1, 2000; pp. 193-197.

Leyva-Del-Foyo, et al.; "Predictable Interrupt Management for Real Time Kernels over Conventional PC Hardware"; Proceedings of the 12th IEEE Real-Time and Embedded Technology and Applications Symposium, San Jose, CA; Apr. 4-7, 2006; 10 pages.

Maquelin, et al.; "Polling Watchdog: Combining Polling and Interrupts for Efficient Message Handling"; Institute of Electrical and Electronics Engineers Association for Computing Machinery; Proceedings of the 23rd Annual Symposium on Computer Architecture; New York; vol. 23, May 22, 1996; 10 pages.

\* cited by examiner

METHOD AND SERVER FOR SYNCHRONIZING A PLURALITY OF CLIENTS ACCESSING A DATABASE

PRIORITY CLAIM

This application claims benefit of priority of European application no. EP 07 009 132.7 titled "Method and Server for Synchronizing a Plurality of Clients Accessing a Database", filed May 7, 2007, and whose inventor is Heinz Kreuder.

INCORPORATION BY REFERENCE

European application no. 07 009 132.7 titled "Method and Server for Synchronizing a Plurality of Clients Accessing a Database", filed May 7, 2007, and whose inventor is Heinz Kreuder, is hereby incorporated by reference in its entirety as though fully and completely set forth herein.

1. TECHNICAL FIELD

The present application relates to a method and a server for synchronizing a plurality of clients accessing a database, wherein each client executes a plurality of tasks on the database.

2. THE PRIOR ART

Databases are very important technical tools of modern information societies. Typically, databases are constantly accessed by a number of clients deleting, adding or changing the content of the database. For example, in case of a database of a financial institution, there is a continuous flow of transactions performed on the database, which require the correct technical processing of the corresponding data.

For security and performance reasons it is imperative that certain administrative tasks are regularly performed on a database. One example is a backup of the overall database system and all of its data. However, there might be other administrative tasks such as migrating the database to a new hard- and/or software system or tests concerning its performance. Some of the administrative tasks cannot be performed, while the various clients continue to access the database, if inconsistencies of the stored data are to be avoided. For example, if a backup of the database for a financial institution is performed during a transfer of some amount from one account to another, it is to be avoided that the saved data reflect the amount being deduced from the first account but not added to the second account, since the backup occurred in between. This is only one example which shows the need to synchronize for some administrative task all clients operating on the database or at least the clients, which could cause such inconsistencies.

In the prior art, it is known to perform such a synchronization as described in the following with respect to FIGS. 1 and 2:

FIG. 1 schematically presents an arrangement of a plurality of clients c0-c5 operating on a database 1. The clients c0-c5 are synchronized, if none of them has any open tasks on the database 1. When a client, which is presently at the requested status (no open task on the database), wants to open a new task on the database 1 after a synchronization request has been issued, the request of the client is rejected and the client is instructed to wait until the synchronization is achieved and the administrative task is finished (cf. the flow chart of FIG. 2)

If a client is performing a certain task at the time the synchronization request is issued and does not change the status to the requested one (for example from "open task" to "closed task") within a given timeout period, the client is reset to the desired status so that it no longer blocks the synchronization and the subsequent execution of the administrative task.

However, in some situations a client may lose the connection to the database, when the synchronization request is issued. As a result, any other client trying to open a task during the timeout period will have to wait until this time limit is exceeded, even if the tasks of one or more of the other clients could be performed and finished before the timeout period has fully elapsed. The prior art approach for the processing of a synchronization request may therefore easily cause substantial waiting times for a large number of clients only for the reason that one client has lost the connection to the database. Reducing the timeout period would be the obvious way of reducing the waiting time for the other clients. However, a reduced timeout period will increase the number of cancelled tasks, which have to be restarted after the synchronization is achieved and the respective administrative task is performed.

In view of the above, it is the technical problem underlying a first aspect of the present invention to provide a more efficient method of synchronizing the plurality of clients, which can lead to reduced waiting times for the clients accessing the database without increasing the number of cancelled tasks.

SUMMARY OF THE INVENTION

Various embodiments presented herein address the problem described above. In one embodiment, the method may include (e.g., for each client) accumulating the time of one or more tasks performed by the client after the issuance of a synchronization request. The method may further include rejecting a request for the opening of a new task of the client, if the accumulated task time exceeds a maximum accumulated task time.

Accordingly, rather than rejecting any request to open a new task, the opening of new tasks may be allowed for those clients who do not exceed a given time limit for the sum of all of their task durations after the synchronization request was issued. Clients can therefore continue to work, if there is another client which does not close its task rapidly, e.g., a client which has lost connection to the database. As a result, the average waiting time for a client will be shorter.

In one embodiment, the method further comprises the step of defining a common maximum accumulated task time for all clients. In this embodiment, all clients are treated equally. Alternatively, the method may further comprise the step of individually defining a maximum accumulated task time for each client. An individual definition of the maximum accumulated task time allows for the ability to prioritize some clients by assigning greater values for the maximum accumulated task time, which reduces the likelihood of a rejection of a new task of such a client during the processing of a synchronization request.

In another embodiment, groups of clients are defined and all clients of a certain group have the same maximum accumulated task time, but the values differ from group to group.

The described method is in one embodiment combined with the above described prior art approach. Accordingly, a task performed after synchronization may be terminated, if the task is open for more than a timeout period. Also, the timeout period can be a general parameter for all clients or individually or group wise selected, if certain clients are to be given more time to execute their tasks. The values of the timeout period and the maximum accumulated task time will determine both, the average waiting time for each client as well as the average waiting time before the synchronization request can be fulfilled. In one embodiment, the value(s) for the timeout period and the value(s) for the maximum accumulated task time are related.

Further modifications of the described method are described below.

According to another aspect, embodiments herein may relate to a database server, which may be adapted to perform any of the above described methods. According to still another aspect, the present invention relates to a computer program comprising instructions for performing any of the above described methods.

SHORT DESCRIPTION OF THE DRAWINGS

Figure 2:
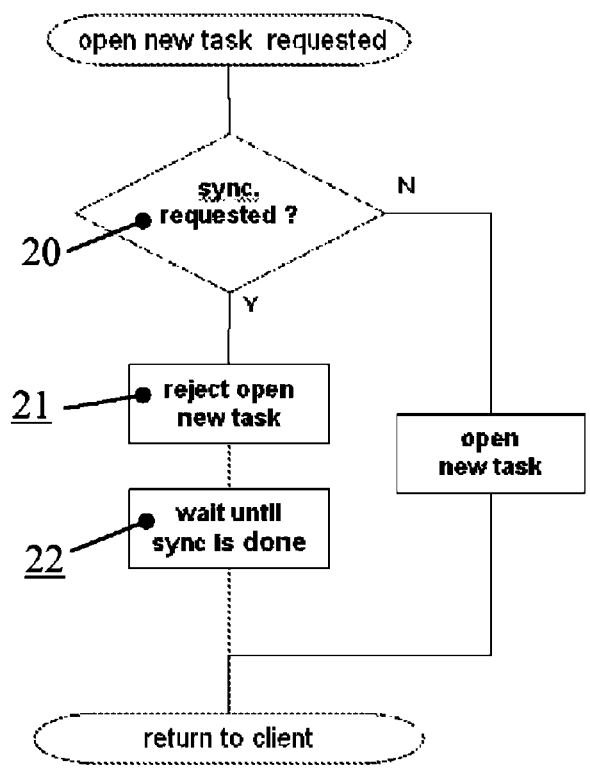
Figure 3A:
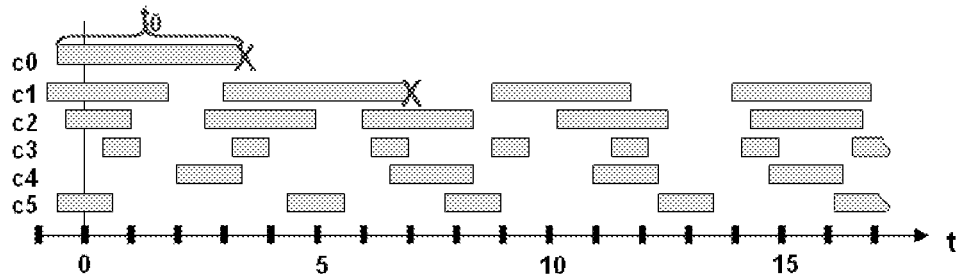
Figure 3B:
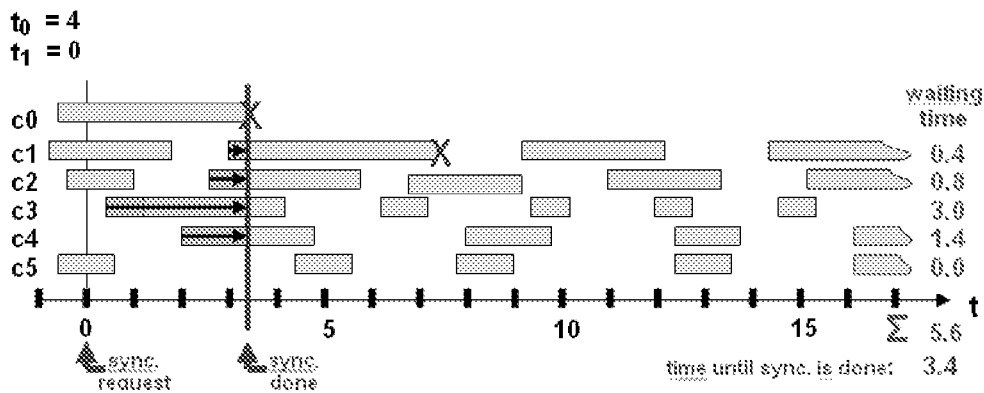
Figure 4:
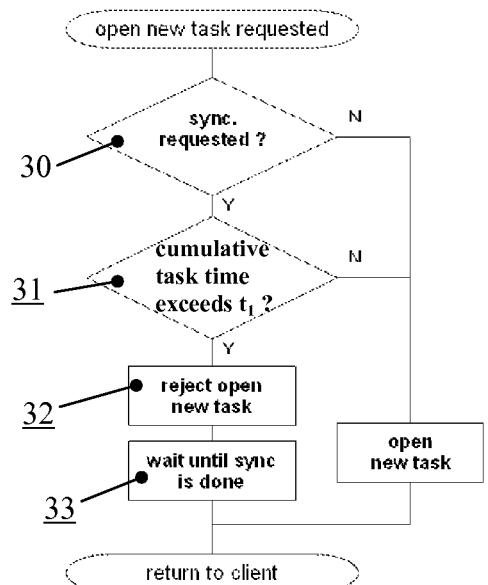
Figure 5:
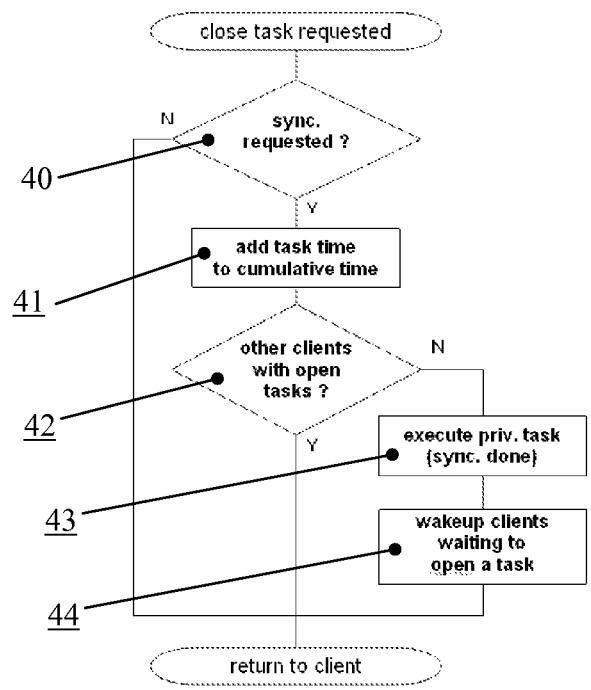

In the following detailed description, presently preferred embodiments are described with reference to the following figures:

FIG. 1: An exemplary arrangement of a data storage, a database server and a plurality of clients according to one embodiment;

FIG. 2: A flowchart illustrating an exemplary method for processing of a new open task request of a client after a synchronization request according to the prior art;

FIG. 3*a*: Timing diagram illustrating the normal processing of tasks of the clients without synchronization request according to one embodiment;

FIG. 3*b*: Timing diagram illustrating the waiting time incurred by the method according to the prior art;

FIG. 4: A flowchart illustrating an exemplary method for processing of a new open task request of a client after a synchronization request according to one embodiment of the present invention;

FIG. 5: A flowchart illustrating an exemplary method for processing of a synchronization request according to one embodiment; and FIG. 6*a*-*c*: Exemplary timing diagrams according ton one embodiment.

DETAILED DESCRIPTION

FIG. 1 presents schematically a database 1 comprising a data storage 2 and a database server 3. The database server 3 is connected to a number of clients c0-c5 using suitable network technologies such as the Internet. The arrangement of FIG. 1 is only an example and not essential for the present invention. In particular, there may be many more clients cn (n>5) connected to the database server 3, which are for the sake of simplicity not shown in the Figures. Additionally, one or more additional databases, data storages, and/or database servers may be included in various embodiments.

The clients c0-c5 may execute various tasks on the database 1, e.g., as shown in the exemplary timing diagram of FIG. 3*a*. As can be seen, the tasks have different lengths in time. Further, there may be periods of time, when a certain client c0-c5 is not executing any task on the database 1.

FIG. 3*a* also illustrates that some tasks may be cancelled, e.g., if their processing takes longer than a certain timeout period $t_0$. This situation is illustrated by a "X" terminating a certain task. In the example of FIG. 3*a*, the timeout period is 4 min. However, this is only an exemplary value. Depending on the tasks to be performed, the capabilities of the overall system and the desired response times, the timeout period could be up to several orders of magnitude shorter or longer.

For certain administrative tasks, it is necessary to synchronize the various clients c0-c5. In other words, a synchronized state is needed, wherein all tasks are closed and wherein no new task is opened so that the administrative task, for example a backup of the data storage 2, can be performed and provides a consistent set of data.

FIG. 2 illustrate the prior art approach for bringing all exemplary clients c0-c5 into the synchronized state. As can be seen from the flow chart of FIG. 2, whenever a client intends to start a new task, it is in a first step 20 verified, whether a synchronization has in the meantime been requested. If not, the new task may be opened (cf. right branch in FIG. 2). However, if there is a synchronization request, the "open new task" request of a client may be rejected in step 21. In step 22, the client has to wait before the task can be opened until the synchronization is achieved and any subsequent administrative task is terminated.

The resulting effect on the timing of the tasks of the clients c0-c5 is shown in FIG. 3*b*. As can be seen, the synchronization request may be issued at t=0. Thereafter, none of the clients c0-c5 may be allowed to start a new task. The desired new tasks of the clients c1-c4 may be shifted to a point in time, when the synchronization is done (and for example a backup executed, not shown in the figures). This is illustrated by the horizontal arrows, the lengths of which reflect the delay for the respective task. On the right side of FIG. 3*b* it is shown that the overall waiting time for the clients is 5.6 min. The time until the synchronized state is actually achieved is slightly more than 3 min due to the client c0. The first task of c0 may be cancelled after the timeout period to has expired. As can be seen from a comparison with FIG. 3*a*, the requested tasks of the clients c3 and c4 are so short that they could both have been fully performed while they were waiting for the cancellation of the first task of client c0. Note that the above described times are exemplary only and that other times are envisioned.

FIG. 4 presents a schematic flowchart of an embodiment of the method according to the invention, which overcomes this inefficiency. In a preliminary step (not shown in FIG. 4) a maximum accumulated task time $t_1$ may be defined, either individually for one or more clients or collectively for all of the clients c0-c5, as explained above. When a new open task is requested, it may also be verified in step 30, whether a synchronization request has been issued. If so, the request may not automatically rejected. Instead, a comparison may be made in step 31 to establish, whether the cumulative task time of tasks performed by the respective client after the issuance of the synchronization request exceeds the predefined maximum accumulated task time $t_1$. Only if this condition is also fulfilled, the requested new task may be rejected in step 32 and the client has to wait in step 33 until the synchronization is done.

The decision process for deciding, when the synchronized state is reached and a corresponding administrative task such as a backup can be performed, is shown in FIG. 5. The steps of FIG. 5 are preferably always performed, when a task of any of the clients is closed. In step 40 it may be again verified, whether a synchronization has been requested. In step 41 the time of the task at hand is added to the cumulative task time of the respective client to enable a meaningful comparison in the above explained method step 31, if the same client issues a further request to open a new task before the synchronized state is reached. In step 42 it is verified, whether there are any further clients with open tasks. If not, the synchronized state is achieved in step 43 and any administrative task (or a plurality thereof) can be performed. Immediately thereafter, a wakeup call may be issued in step 44 to one or more of the clients, which had requested to open a task after the synchronization request was issued, but which were rejected in the above explained method step 32.

Figure 6A:
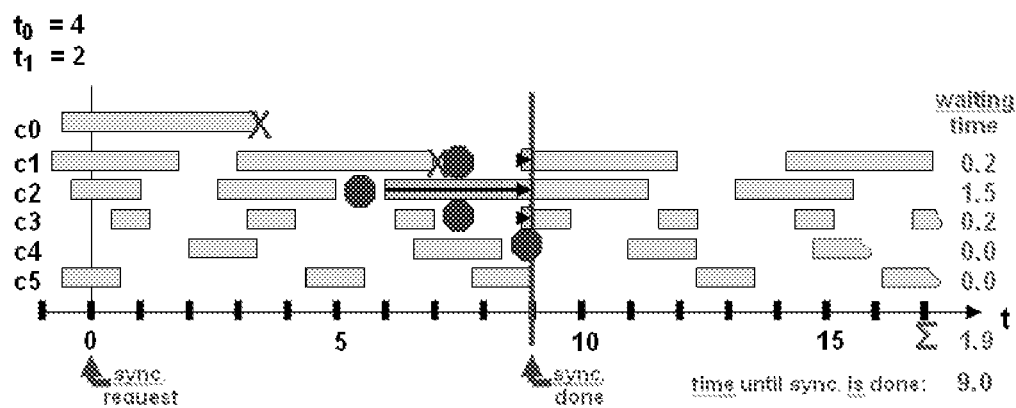
Figure 6B:
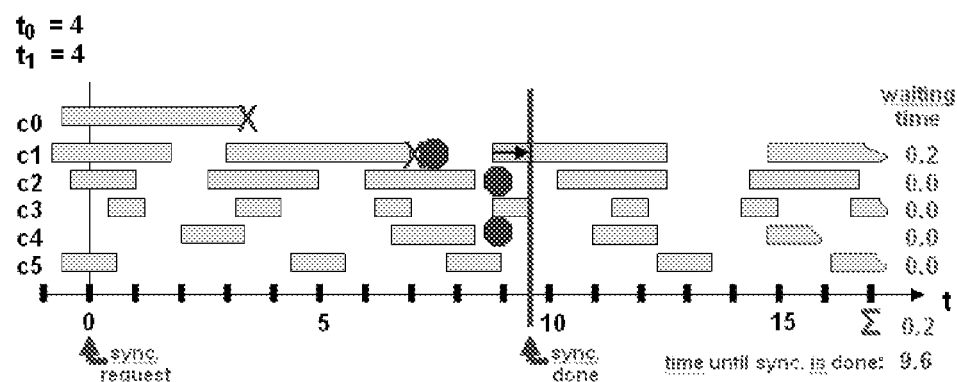
Figure 6C:
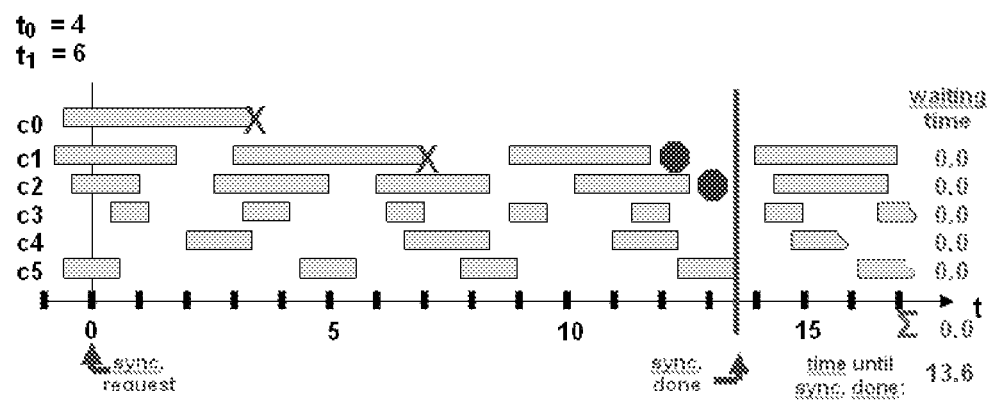

Examples of the resulting timing diagrams are shown in FIGS. 6a-6c. In these diagrams the "X" still indicates tasks that have exceeded a certain timeout period $t_0$ and are therefore cancelled. The filled bullet point indicates a situation, wherein the cumulative task time of a client exceeds the maximum accumulated task time $t_1$ so that no new tasks are allowed for this client.

As can be seen, the average time between the issuance of the synchronization request and the point in time, when the synchronized state is reached, is longer using an embodiment of the invention compared to the above described prior art approach. Taking the diagram of FIG. 6a, wherein the maximum accumulated task time $t_1$ is set to 2 min, the synchronization is reached at a later point in time than in the diagram of FIG. 3b, namely after 9 min. However, the overall waiting time for the clients is reduced to 1.9 min compared to the above mentioned 5.6 min in the diagram of FIG. 3b.

Generally, there is a relation between the overall waiting time and value of the maximum accumulated task time $t_1$. If the value of the parameter $t_1$ is greater, the overall waiting time may be further reduced as can be seen from a comparison of the diagrams in FIGS. 6a-6c with $t_1$ increasing from 2 to 6. In fact, the described method leads in the example of FIG. 6c to a synchronization at a point in time, which does not require the waiting of any new tasks of the clients c0-c5. If needed, the parameter $t_1$ could also be dynamically selected based on the relevance of the administrative task to be performed.

As a result, the described parameter of the maximum accumulated task time $t_1$ allows to prioritize the tasks of the clients versus the administrative task. For example a backup of the overall system should be regularly performed for security reasons. However, the precise point in time, when all clients are synchronized so that a consistent set of data can be stored, is less relevant and may have a lower priority than continuing to serve the various clients with as little delay as possible. As already mentioned above, it is further possible to refine the timing properties by selecting individual values for each client both for the maximum accumulated task time $t_1$ and for the timeout period to. Note that the above times are exemplary only and that other times and methods pertaining thereto are envisioned.

The described method can be executed by one or more database servers, e.g., the database server 3, which controls the data storage 2 and serves the various clients c0-c5. To this end, the corresponding instructions can be implemented in the hard- and/or software of the one or more servers (e.g., the database server 3). In case of a software implementation, the respective computer program comprises instructions to perform the above described method steps. The program instructions may be stored on a memory medium and executed by a processor. In various embodiments, the memory medium may comprise one or more memory mediums, e.g., spread across one or more computer systems, such as, for example, the database server 3 and/or other computers.

The invention claimed is:

1. A method of synchronizing a plurality of client processes accessing a database, each client process executing a plurality of tasks on the database, the method comprising:
    a server performing:
        for each of the client processes:
            accumulating time spent performing tasks on the database by the client process since issuance of a synchronization request, thereby determining an accumulated task time for the client process; and
            rejecting a request for opening of a new task on the database for the client process, in response to the accumulated task time exceeding a threshold, wherein the threshold specifies a maximum accumulated task time.

2. The method of claim 1, further comprising defining a common maximum accumulated task time for all client processes.

3. The method of claim 1, further comprising individually defining a maximum accumulated task time for each client process.

4. The method of claim 1, further comprising performing a task on the database after synchronization is terminated, if the task is open for more than a timeout period.

5. The method of claim 1, wherein the value for the timeout period and the value for the maximum accumulated task time are related.

6. The method of claim 1, further comprising performing an administrative task on the database comprising a backup of the database, when there is no more open task of a client process.

7. The method of claim 6, further comprising initiating the new task after the administrative task has been performed.

8. The method of claim 6, further comprising performing a wakeup for all client processes having a rejected task after the administrative task has been performed.

9. A non-transitory memory medium comprising program instructions for synchronizing a plurality of client processes accessing a database, each client process executing a plurality of tasks on the database, wherein the program instructions are executable by a processor to:
    for each of the client processes:
        accumulate time spent performing tasks on the database by the client process since issuance of a synchronization request, thereby determining an accumulated task time for the client process; and
        reject a request for opening of a new task on the database for the client process, in response to the accumulated task time exceeding a threshold, wherein the threshold specifies a maximum accumulated task time.

10. The non-transitory memory medium of claim 9, wherein the program instructions are further executable to define a common maximum accumulated task time for all client processes.

11. The non-transitory memory medium of claim 9, wherein the program instructions are further executable to individually define a maximum accumulated task time for each client process.

12. The non-transitory memory medium of claim 9, wherein the program instructions are further executable to perform a task on the database after synchronization is terminated, if the task is open for more than a timeout period.

13. The non-transitory memory medium of claim 9, wherein the value for the timeout period and the value for the maximum accumulated task time are related.

14. The memory medium of claim 13, wherein the program instructions are further executable to initiate the new task after an administrative task has been performed.

15. A database server for synchronizing a plurality of client processes accessing a database, comprising:
a processor; and
a memory medium coupled to the processor, wherein the memory medium stores a database and program instructions for synchronizing a plurality of client processes accessing the database, each client process executing a plurality of tasks on the database, wherein the program instructions are executable by the processor to:
for each of the client processes:
accumulate time spent performing tasks on the database by the client process since issuance of a synchronization request, thereby determining an accumulated task time for the client process; and
reject a request for opening of a new task on the database for the client process, in response to the accumulated task time exceeding a threshold, wherein the threshold specifies a maximum accumulated task time.

16. The database server of claim 15, wherein the program instructions are further executable to define a common maximum accumulated task time for all client processes.

17. The database server of claim 15, wherein the program instructions are further executable to individually define a maximum accumulated task time for each client process.

18. The database server of claim 15, wherein the program instructions are further executable to perform a task on the database after synchronization is terminated, if the task is open for more than a timeout period.

19. The database server of claim 15, wherein the value for the timeout period and the value for the maximum accumulated task time are related.

20. The database server of claim 19, wherein the program instructions are further executable to initiate the new task after an administrative task has been performed.

* * * * *